Jan. 15, 1952     C. MADDOX     2,582,640

CASTRATING BAND APPLYING TOOL

Filed May 9, 1950

Claude Maddox
INVENTOR.

BY *Clarence A. O'Brien
and Harvey B. Jacobson*
Attorneys

Patented Jan. 15, 1952

2,582,640

UNITED STATES PATENT OFFICE 2,582,640

CASTRATING BAND APPLYING TOOL

Claude Maddox, Flemingsburg, Ky.

Application May 9, 1950, Serial No. 160,839

3 Claims. (Cl. 128—303)

The present invention relates to new and useful improvements in tools for applying an elastic band to a part of an animal for cutting off circulation therein and resulting in the castration of the animal.

An important object of the invention is to provide a tool of the pivoted handle type and having laterally projecting pins on which an elastic band is placed for expanding the band to facilitate placing thereof on the tail or scrotum of the animal and which cuts off circulation therein by the contraction of the band when released from the tool, the affected parts of the animal subsequently drying up to result in the castration of the animal.

A further object is to provide a tool of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
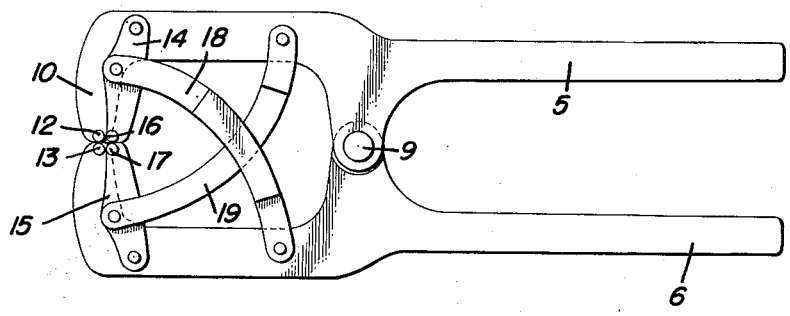
Figure 1 is a side elevational view showing the jaws of the tool in closed position.

Referring now to the drawing in detail wherein for the purpose of illustration I have disclosed a preferred embodiment of the invention, the numerals 5 and 6 designate a pair of handles having laterally projecting apertured ears 7 and 8 adjacent the front ends of the handle and aligned with each other to receive a pivot pin 9 to pivotally connect the handles to each other. The front ends of the handles are curved inwardly to form opposed jaws 10 and 11 and from one side of which pins or pegs 12 and 13 project laterally.

Arms 14 and 15 are pivoted at one end to one side of the handles 5 and 6 at the rear portion of jaws 10 and 11 and with the free ends of the arms 14 and 15 swingable at the sides of the jaws and also provided with laterally projecting pins or pegs 16 and 17 at their free ends for movement forwardly and rearwardly into and out of position adjacent the pins or pegs 12 and 13.

An arcuate link 18 is pivoted at one end to the central portion of arm 14 and is pivoted at its opposite end to handle 6 rearwardly of arm 15 and a similar arcuate link 19 is pivoted at one end to the central portion of arm 15 and is pivoted at its other end to the handle 5 rearwardly of arm 14. As will be seen, the links 18, 19 are arranged in crossed relation.

In the operation of the tool, the links 18 and 19 connecting the respective arms 14 and 15 to an opposite handle will actuate the arms by the movement of the handles when opening and closing jaws 10 and 11.

When the jaws are closed the links 18 and 19 will swing the arms 14 and 15 forwardly into end-to-end relation to position pins or pegs 16 and 17 closely behind pins or pegs 12 and 13, in a manner as shown in Figure 1 of the drawing.

Figure 2:
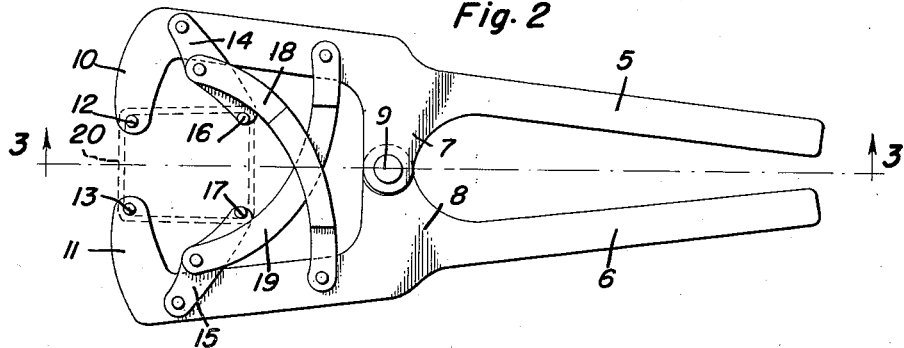
Figure 2 is a similar view showing the tool in open position.
Figure 3:
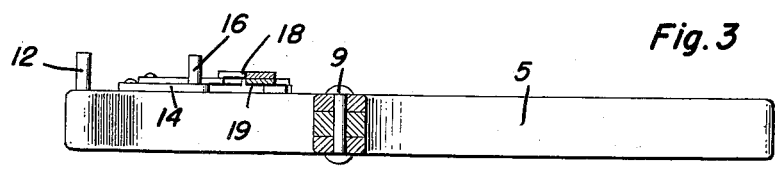
Figure 3 is a longitudinal sectional view taken on a line 3—3 of Figure 2.
Figure 4:
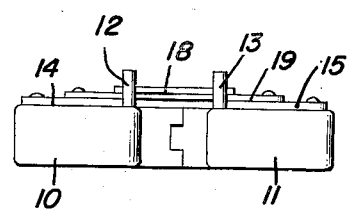
Figure 4 is a front end elevational view.

A rubber or elastic band 20 is placed over the closely grouped pins or pegs 12, 13, 16 and 17 and by moving handles 5 and 6 inwardly toward each other, jaws 10 and 11 will be moved away from each other into an open position and links 18 and 19 will swing arms 14 and 15 into rearwardly inclined converging relation to expand the rubber band, as shown in Figure 2 of the drawing. The expanded rubber band may then be easily placed on the tail or scrotum of an animal in a position close to the body and pressure on handles 5 and 6 released whereupon the tension of the elastic band 20 will close jaws 10 and 11 and the pins or pegs removed from the band which then cuts off the circulation of the affected part of the animal. The affected part eventually dries up and either falls off or its function destroyed.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a tool for expanding an elastic band, a pair of handles pivoted to each other and having front end jaws movable by said handles toward and from each other, a pair of lateral pins on said jaws movable toward and from each other by corresponding movement of said jaws, a pair of arms pivoted at corresponding ends thereof on said handles in the rear of said jaws for swinging forwardly into end-to-end relation and rearwardly into inclined converging relation, a pair of lateral pins on the other ends of said arms swingable toward each other and toward said first-named pins when said arms are swung toward end-to-end relation and being swingable by said arms away from each other and the first-named pins when said arms are swung into converging relation, and means operatively connecting said handles to said arms to swing the same into end-to-end relation and into rearwardly inclined converging relation when said jaws are moved toward and from each other respectively, said pins being adapted to be encircled by said band for stretching.

2. A tool according to claim 1 wherein said means comprises crossed links pivotally fastened to said handles and arms.

3. A tool according to claim 1 wherein said means comprises crossed links pivotally fastened to said handles and to said arms intermediate the ends of the arms.

CLAUDE MADDOX.

REFERENCES CITED

The following references are of record in the file of this patent:

UNITED STATES PATENTS

| Number | Name | Date |
|---|---|---|
| 1,806,339 | Ferris | May 19, 1931 |
| 2,447,474 | Hammond | Aug. 17, 1948 |

FOREIGN PATENTS

| Number | Country | Date |
|---|---|---|
| 539,998 | Great Britain | Oct. 1, 1941 |